(12) United States Patent
Schliwa et al.

(10) Patent No.: US 9,511,867 B2
(45) Date of Patent: Dec. 6, 2016

(54) DEVICE FOR MOUNTING A VEHICLE ATTENDANT SEAT IN A CABIN OF A VEHICLE, CABIN ARRANGEMENT IN A VEHICLE, AND VEHICLE WITH AT LEAST ONE CABIN ARRANGEMENT

(71) Applicant: Airbus Operations GmbH, Hamburg (DE)

(72) Inventors: Ralf Schliwa, Hamburg (DE); Roland Lange, Hamburg (DE); Jan-Ole Jedraszczyk, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 76 days.

(21) Appl. No.: 14/493,952

(22) Filed: Sep. 23, 2014

(65) Prior Publication Data

US 2015/0084391 A1 Mar. 26, 2015

(30) Foreign Application Priority Data

Sep. 23, 2013 (DE) ........................ 10 2013 110 500

(51) Int. Cl.
*B64D 11/00* (2006.01)
*B64D 13/00* (2006.01)
*B64D 11/06* (2006.01)

(52) U.S. Cl.
CPC ................................ *B64D 11/0691* (2014.12)

(58) Field of Classification Search
CPC . B64D 11/0691; B64D 11/0698; B64D 25/04; B60N 2/0735; B60N 2/0742
See application file for complete search history.

(56) References Cited

U.S. PATENT DOCUMENTS

| 3,594,037 A | 7/1971 | Sherman |
| 4,460,215 A | 7/1984 | Chamberlain et al. |

(Continued)

FOREIGN PATENT DOCUMENTS

| CN | 101909935 A | 12/2010 |
| DE | 3629505 A1 | 3/1988 |

(Continued)

OTHER PUBLICATIONS

European Patent Office, European Search Report for European Patent Application No. 14185764.9 mailed Feb. 20, 2015.

(Continued)

*Primary Examiner* — Philip J Bonzell
(74) *Attorney, Agent, or Firm* — Lorenz & Kopf LLP

(57) ABSTRACT

A device for mounting a vehicle attendant seat in a cabin of a vehicle is provided. The device includes a retaining body, a receiving device arranged on the retaining body for mounting the vehicle attendant seat, a pivoting mechanism arranged on the retaining body, a first locking device and an elongated rail on which the pivoting mechanism is slidably held and connectable to a wall surface in the cabin of the vehicle. External contours of the retaining body span a plane; the receiving device is arranged on a surface of the retaining body, which surface extends parallel to the plane, and is designed to mechanically connect the vehicle attendant seat to the retaining body. The vehicle attendant seat may be stowed, slid into an indentation in the vehicle, and for use may be pulled from the indentation, may be pivoted and may be locked.

17 Claims, 8 Drawing Sheets

(56) References Cited

U.S. PATENT DOCUMENTS

| | | | |
|---|---|---|---|
| 4,580,832 A | | 4/1986 | Maruyama et al. |
| 4,740,030 A | * | 4/1988 | Nordskog ................ A47C 9/06 16/289 |
| 4,799,632 A | | 1/1989 | Baymak et al. |
| 4,993,666 A | * | 2/1991 | Baymak .................... B09B 1/00 244/122 R |
| 5,335,963 A | | 8/1994 | Mueller et al. |
| 6,460,922 B1 | * | 10/2002 | Demick ............... B60N 2/3034 296/65.11 |
| 7,905,451 B2 | | 3/2011 | Schotte et al. |
| 9,199,740 B2 | * | 12/2015 | Ehlers ................ B64D 11/0691 |
| 9,260,190 B2 | * | 2/2016 | Ehlers .................... B64D 11/06 |
| 2011/0210590 A1 | | 9/2011 | Mori et al. |
| 2012/0199695 A1 | | 8/2012 | Isherwood et al. |
| 2013/0334369 A1 | * | 12/2013 | Schliwa ................. B64D 11/02 244/118.5 |

FOREIGN PATENT DOCUMENTS

| | | |
|---|---|---|
| DE | 8626158 U1 | 1/1989 |
| DE | 69817241 T2 | 3/2004 |
| DE | 102005009750 B4 | 4/2009 |
| DE | 102010018896 A1 | 11/2011 |
| DE | WO 2012110643 A1 * | 8/2012 ............. B64D 11/02 |
| DE | 102011011704 A1 | 12/2012 |
| EP | 0170116 B1 | 2/1986 |
| EP | 0867365 A2 | 9/1998 |
| EP | 1777100 A1 | 4/2007 |
| EP | 2724938 A1 | 4/2014 |
| FR | 2926503 A1 | 7/2009 |
| GB | 2288728 A | 11/1995 |
| WO | 2012110643 A1 | 8/2012 |

OTHER PUBLICATIONS

German Patent Office, German Search Report for German Application No. 10 2013 110 500.9 mailed Aug. 5, 2014.

German Patent Office, German Search Report for German Application No. 10 2012 005 980.9 mailed Jul. 11, 2012.

International Searching Authority, International Search Report for International Application PCT/EP2013/055674, mailed Jun. 13, 2013.

State Intellectual Property Office of the Peoples' Republic of China, Office Action for Chinese Patent Application No. 201380015461.X mailed Jul. 3, 2015.

* cited by examiner

DEVICE FOR MOUNTING A VEHICLE ATTENDANT SEAT IN A CABIN OF A VEHICLE, CABIN ARRANGEMENT IN A VEHICLE, AND VEHICLE WITH AT LEAST ONE CABIN ARRANGEMENT

CROSS-REFERENCE TO RELATED APPLICATION

This application claims priority to German Patent Application No. 10 2013 110 500.9, filed Sep. 23, 2013, which is incorporated herein by reference in its entirety.

TECHNICAL FIELD

The technical field relates to a device for mounting a vehicle attendant seat in a cabin of a vehicle, to a cabin arrangement in a vehicle, and to a vehicle with at least one cabin arrangement.

BACKGROUND

One object in fitting out passenger cabins in means of transport relates to optimizing the space available for passengers in order to maximize the number of seats available. Such optimization is limited among other things by the number of prescribed seats for crew members, by prescribed safety devices, supply devices and toilets. The ratio of the number of passenger seats to remaining devices in passenger cabins is a factor that contributes to determining the operating efficiency of an aircraft in scheduled transport services. Apart from rules issued by authorities, which rules relate to type certification and operating certification of means of transport, in the selection of seat sizes, seat pitches, supply devices and toilets it is also necessary to include customer requirements, for example customer-specific fixtures requested by operators of the means of transport.

It is not possible to do without flight attendant seats or to position them in places within the cabin that are not usable for passenger transport. During those flight phases where seats must be taken and seat belts must be fastened it is mandatory for flight attendants to have a complete overview of the cabin. Consequently, flight attendant seats exist that are foldable and thus designed so as to be relatively space saving.

DE 36 34 839 C2 discloses a flight attendant seat in a double arrangement in the opposite direction, with a backrest and a foldably-mounted seating surface for each partial seat.

DE 4 125 958 discloses a flight attendant seat that is integrated in a row of passenger seats instead of a passenger seat.

DE 10 2005 009 750 B4 discloses an arrangement comprising a seat and a flight attendant seat, wherein the flight attendant seat is arranged directly behind the seat, when viewed in the direction of flight, while nevertheless, as a result of a hinged arrangement, allowing hinging-back of the seat.

Furthermore, flight attendant seats are known that are arranged on a floor-guided pedestal that is hingeable together with the flight attendant seat situated thereon.

In addition, other objects, desirable features and characteristics will become apparent from the subsequent summary and detailed description, and the appended claims, taken in conjunction with the accompanying drawings and this background.

SUMMARY

While the space-saving design of a flight attendant seat may reduce the space taken up by it, nevertheless, as a result of the predominantly fixed arrangement of such seats on cabin installations or on heavy and bulky pedestals, in practical applications no clear space savings are noticeable.

According to various embodiments, provided is a device for accommodating or affixing a vehicle attendant seat in a cabin of a vehicle, which device makes it possible to utilize the available design space so that more space for passenger seats is created in the cabin of the vehicle.

In one embodiment, provided is a device for retaining a vehicle attendant seat in a cabin of a vehicle. The device comprises a retaining body with a top edge, a bottom edge and a pivoting edge; a receiving device for a vehicle attendant seat, which receiving device is arranged on the retaining body; at least one pivoting means affixed to the pivoting edge of the retaining body; at least one first locking means and at least one elongated rail on which the at least one pivoting means is slidably held, which rail is connectable to a wall surface in the cabin of the vehicle. External contours of the retaining body span a plane, and the receiving device is arranged on a surface of the retaining body, which surface extends parallel to the plane. Furthermore, the receiving device is designed to mechanically connect the vehicle attendant seat to the retaining body.

Consequently, the retaining body is a largely planar component which, however, need not mandatorily comprise a closed surface, but instead may also be implemented in the form of a frame, a frame structure or a combination of a frame and closed-surface components. The retaining body thus forms the base of the vehicle attendant seat that is to be provided in the cabin of the vehicle. The external contour of the retaining body is, in particular, determined by a top edge, a bottom edge and a pivoting edge. By way of the at least one pivoting means, which is affixed to the pivoting edge of the retaining body, hinging of the retaining body on a hingeing axis is possible. Said hinging axis may be aligned so as to be parallel to the pivoting edge of the retaining body; in the device according to the present disclosure, arranged in the cabin of the vehicle, said hinging axis is generally arranged vertically in the cabin of the vehicle, i.e. parallel to a vertical axis.

The retaining body as the base of a vehicle attendant seat comprises a receiving device that is designed to receive a vehicle attendant seat. As a result of adapting the receiving device it is not necessary to adapt a vehicle attendant seat for the device according to the present disclosure; instead said vehicle attendant seat may be arranged directly on the retaining body.

The receiving device for the vehicle attendant seat may be designed in various ways in order to allow simple but nonetheless stable and light-weight mounting of the vehicle attendant seat. Apart from an arrangement of boreholes, hooks, sections, openings or projections it would also be imaginable to use a sheet-like or frame-like flange that may be mounted on the retaining body and that on a surface facing away from the retaining body comprises attachment devices that are adapted to the vehicle attendant seat to be used. This may also be an arrangement of projections, boreholes, openings, hooks or the like. In this arrangement may be advantageous if only the receiving device is adapted to the particular vehicle attendant seat; the retaining body may comprise standard boreholes in order to retain various adapted receiving devices.

The at least one pivoting means is designed to allow rotation of the retaining body on a pivoting axis, to which effect hinges or other one-dimensionally pivoting joints may be used. If as a result of the available design space this should be necessary, or desirable from a design point of view, it would also be possible to use a single pivoting means that in view of the expected loads on the retaining body would have to be dimensioned so as to be correspondingly greater than two or three pivoting means.

The at least one elongated rail is a device that allows linear displacement of a pivoting means arranged thereon. Apart from the actual pivoting movement of the retaining body and of the vehicle attendant seat arranged thereon, the device also makes it possible to displace a vehicle attendant seat along the at least one rail along its direction of extension. The rail is generally arranged horizontally on a wall in the cabin of the vehicle, or is integrated horizontally therein. Subsequently the vehicle attendant seat may be aligned parallel to the rail or perpendicularly to it so as to rotate on the pivoting edge. At least in a parallel arrangement it is possible to slide the vehicle attendant seat on the wall along the elongated rail. This makes it possible to stow the vehicle attendant seat in a niche, a stowage compartment, a recess, a ledge or some other indentation on or in a cabin configuration component or the like if an adjoining wall comprises the at least one elongated rail. In its stowed state the vehicle attendant seat is accommodated in a space-saving manner so that in that state it does not block any exterior surfaces of the particular cabin configuration components or the like.

The at least one first locking means further ensures that the vehicle attendant seat is locked to the retaining body at least in an in-use position so that use of the vehicle attendant seat becomes possible under all the relevant operating regulations and approval regulations of the vehicle.

Furthermore, in a stowed state, locking may take place by means of the first locking means or by means of a separate, second, locking means that is exclusively intended for the purpose of locking or holding in a stowed position. If the vehicle attendant seat in a stowed state is arranged in a stowage compartment or in some other recess or indentation that may be closed by means of a flap, securing of the vehicle attendant seat in this state could be carried out by the closure flap. In this arrangement it should be ensured that in its stowed state the vehicle attendant seat does not swing within the available design space.

Generally speaking, seats in a vehicle are arranged on an immovable object, for example on a wall of a monument in an aircraft cabin, or on a pivotable or hingeable pedestal, that, guided along the floor, may be positioned from a first position to a second position. In contrast to this, according to the various teachings of the present disclosure a wall-like component is provided that is slidably and pivotally arranged, by way of at least one pivoting means, on a partition wall, on installations such as monuments or on other cabin configuration components by way of at least one linear rail. This is associated with an advantage in that in this manner a vehicle attendant seat may be affixed at such positions within a vehicle cabin, which positions are not normally provided for this. This includes, in particular, positions which need to be used during normal operation of an aircraft but that due to regulations must not be used or entered into during takeoff and landing. This may relate to access ways to toilets, galleys, a cockpit, a rest compartment or other installations. By affixing the device according to the present disclosure it is nevertheless possible at this position to arrange a vehicle attendant seat that during takeoff and landing may be moved to an in-use position that is situated directly in front of or in an access way or in front of a stowage compartment. However, in the remaining phases the device may be pivoted and slid so as to be in a stowed position so that the corresponding access way may be used again. An advantage relates to the usability of a vehicle attendant sea that is already certified for the vehicle concerned. It is sufficient to have the combination of retaining body and receiving device certified in order to be able to use seats that have already been certified for use in the vehicle.

In one embodiment the at least one first locking means is arranged on the retaining body so as to be spaced apart from the at least one pivoting means. In this way a particularly large lever arm to a pivoting axis of the pivoting means is implemented, which allows secure locking of the retaining body.

In one embodiment the at least one pivoting means is designed to pivot the retaining body between an alignment parallel to the at least one elongated rail to an alignment perpendicular to the aforesaid. This allows pivoting of the retaining body by at least 90°, which makes it possible for a user to align the retaining body parallel to the at least one elongated rail, and to subsequently slide said retaining body in a space-saving manner into a recess, a stowage compartment, an indentation or the like and to stow it in that location. Likewise, the retaining body may then be pulled from this compacted arrangement in order to be pivoted, for use of the vehicle attendant seat, by 90°, i.e. to a position that is perpendicular to the at least one rail.

In one embodiment, the at least one elongated rail is a telescopic rail. As a result of the telescopic nature of a rail by means of several interacting rail segments, in a stowed state a particularly compact design may be achieved. The implementable sliding path clearly exceeds the design space necessary for accommodating the rail.

In one embodiment the pivoting means is attached to the retaining body by way of a telescopic arrangement that increases the possible space between the retaining body and the at least one elongated rail.

Furthermore, the retaining body can be designed to be variable in width. This can be achieved by means of a telescopic guide arrangement by way of which a section of the retaining body may be extended, which section is arranged on a side of the retaining body, which side is opposite the pivoting edge. Consequently, for the purpose of receiving the vehicle attendant seat the device according to the present disclosure may additionally carry out the function of a blocking grille, which may be useful, in particular, in an arrangement up to or down from a stairway.

In one example, the device comprises an electrical connector device that is arranged on the retaining body. In this arrangement the retaining body itself may provide a connector device for connecting electrical components of a vehicle attendant seat. Consequently there is no need to undertake any modifications to the vehicle attendant seat to be affixed, and the retaining body provides all the devices required for electrical connection according to the usual specifications. In order to ensure prescribed functions the vehicle attendant seat comprises, for example, a wire-bound telephone or handset. Moreover, other electrical devices may also be integrated that may, for example, comprise a work light switch, an illumination device, a seat heater, a massage device etc. These need to be supplied with adequate electrical power.

The device comprises at least one electrical line that extends from the electrical connector device to the pivoting edge. In this manner the electrical connector device may be supplied with electrical power by way of a line, wherein the line is connectable by way of the pivoting edge to a vehicle-fixed component. In this arrangement the electrical line is arranged on the corresponding electrical network, on a bus or the like.

For use in particular in some aircraft may be preferred if the electrical connector device is arranged in a region near the bottom edge of the retaining body, because some vehicle attendant seats available on the open market comprise a corresponding electrical connector device in a lower region. There are, in one example, also flight attendant seats in which the electrical connector device is positioned directly below a cut edge to a headrest so as to minimize to the largest extent possible the cable lengths used seat-internally.

In an embodiment the at least one electrical line is placed over the at least one pivoting means in order to be led to a vehicle-fixed component by way of the at least one elongated rail. To this effect the electrical line may comprise an elastic or flexible sheath that when the retaining body is slid along the at least one elongated rail makes it possible for the electrical line to get out of the way and that implements mounting of said electrical line with as large a bending radius as possible. The excessive length of the electrical line is to be guided on the vehicle-fixed component without hindering any adjacent installations. To this effect a corresponding movement space for the electrical line should be provided.

As an alternative to this, the at least one pivoting means and/or the at least one elongated rail may comprise sliding contacts in order to connect the electrical connector device to a vehicle-fixed component. This obviates the need for providing longer line lengths necessary for movement of the retaining body.

An alternative provides for a pair of coils, wherein one coil could be arranged on a vehicle-fixed component, while the other coil could be arranged on the retaining body. When the retaining body is in its in-use position, this pair of coils forms a transmission device by way of which it is possible to transmit electrical power and/or data.

Moreover, it is imaginable to arrange a first electrical connector on a side of the retaining boy, which side is opposite the pivoting edge, in the region of the at least one first locking means, which first electrical connector corresponds to a second electrical connector that may be mounted on the vehicle side. With the retaining body in its in-use position, an electrical contact may be established between the first electrical connector and the second electrical connector, by way of which contact electrical power and data may then be transmitted.

The various teachings of the present disclosure further relates to a cabin arrangement in a vehicle, comprising a floor area, a vehicle attendant seat, at least one cabin configuration component, arranged on the floor area, with a first wall and an aforementioned device. The at least one elongated rail is arranged on the wall of the cabin configuration component. Furthermore, the vehicle attendant seat is arranged on the receiving device of the retaining body. The floor area may, for example, be formed by the cabin floor on which the passengers walk.

The cabin arrangement can, furthermore, comprise an indentation with an interior surface, wherein the at least one elongated rail is affixed to the interior surface. With the retaining body pivoted parallel to the at least one elongated rail, the retaining body with the vehicle attendant seat arranged on the receiving device is slidable into the indentation. The retaining body retains the vehicle attendant seat arranged on the receiving device; said retaining body may be pulled from the indentation and may be pivoted on an axis that is arranged so as to be perpendicular to the at least one elongated rail. For example, with an access opening arranged perpendicularly to the indentation, the passenger seat is slidable into said indentation or may be pulled from it. It is not mandatory for sliding-in to take place completely; instead, it may also take place partially so that the vehicle attendant seat in a slid-in state finishes off flush, for example, with an adjacent edge of the cabin arrangement.

In an embodiment the at least one cabin configuration component may be selected from a group of cabin configuration components. This group comprises a toilet module, a galley module, a stowage module, a rest compartment module, a stair access, a partition wall to a cockpit, a shared space, a prayer room, a smokers' module, an electronics module/service module, a wash room, a change room, a wardrobe space, a bar module, a reception, and combinations of the aforesaid.

Lastly, the various teachings of the present disclosure also relates to a vehicle with at least one cabin arrangement as presented above. The vehicle may, in one example, be an aircraft. Of course, the present teachings are not limited to the aforesaid. The various teachings of the present disclosure can relate to a rail vehicle, a ship or boat or other earth-bound, water-bound or air-bound vehicles for commercial passenger transport.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
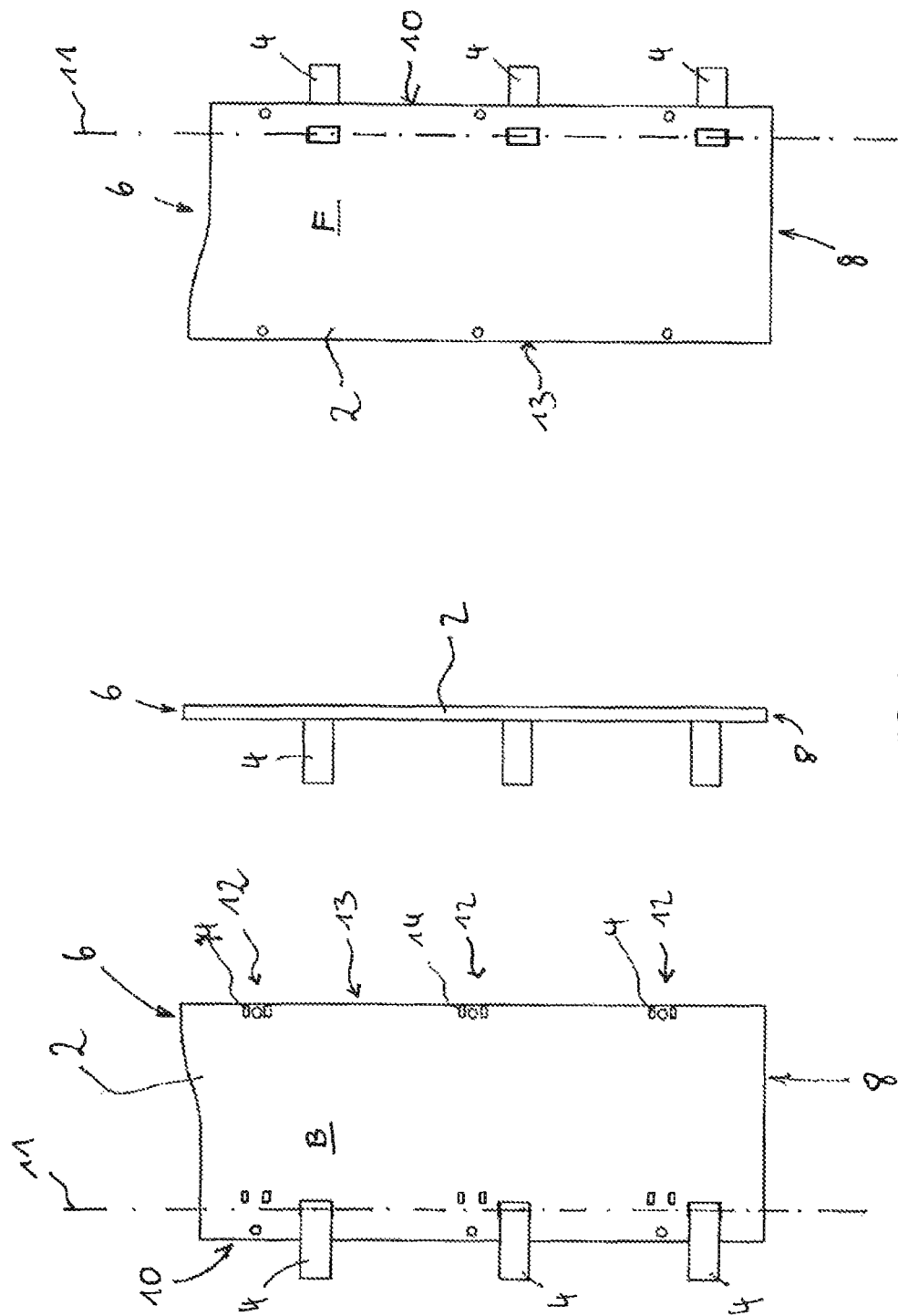
FIG. 1 shows a view from three sides of a retaining body with a receiving device and pivoting means.

FIG. 1 shows a view from three sides of part of the device according to the various teachings of the present disclosure, comprising a retaining body 2 and pivoting means 4 arranged thereon. The retaining body 2 comprises a top edge 6, a bottom edge 8 and a pivoting edge 10 around which the retaining body 2 may be pivoted. The retaining body 2 is a planar flat body that could be produced from a composite material, for example in the form of a sandwich component with a honeycomb structure. On the retaining body 2 a receiving device 12 is arranged that comprises a plurality of boreholes and/or inserts to which a vehicle attendant seat (not shown in FIG. 1) may be screwed so that it is rigidly connected to the retaining body 2.

The right-hand illustration when viewed in the drawing plane shows the front (designated F), while the left-hand illustration when viewed in the drawing plane shows the rear (designated B). As an example, the rear B shows the attachment locations of the pivoting means 4 that furthermore are spaced apart from each other in such a manner that the pivoting edge 10 uniformly comprises pivoting means 4. Furthermore, the pivoting edge 10 is arranged at a particular distance from a pivoting axis 11 determined by the pivoting means, which consequently allows rotation only when the pivoting edge 10 is exposed. The slidability of the pivoting means 4 along an elongated rail is shown below from FIG. 5A onwards.

In the region of the pivoting edge 10 of the retaining body 2, on which pivoting edge 10 the pivoting means 4 are arranged, and on an edge 13 opposite the aforesaid, furthermore, first locking means 14 are arranged by means of which the retaining body 2 may be attached to a vehicle-fixed point. Said locking means 14 may be designed in the form of snap locks or of elements corresponding to snap locks. The corresponding counter-piece (not shown in detail in FIG. 1) is to be arranged on a vehicle-fixed device.

Figure 2:
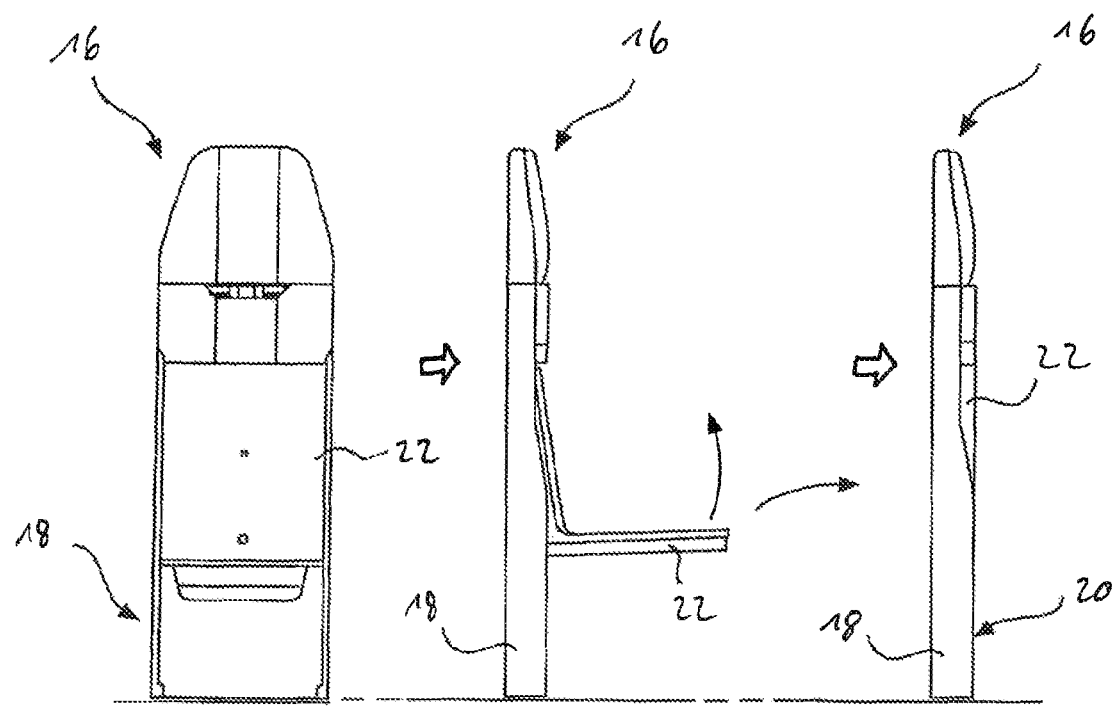
FIG. 2 shows a view from two sides of a commonly-used certified flight attendant seat that can be affixed to the device according to the various teachings of the present disclosure.

FIG. 2. shows a front view and two lateral views of a commonly-used flight attendant seat 16 that can be screwed to the retaining body 2 by way of the receiving device 12. The flight attendant seat 16 comprises a largely uniform width, for example of about 44 cm, which is adequate for temporarily seating a flight attendant. At a lower end a stowage compartment 18 may be arranged in which emergency equipment, for example a life vest and a torch, are housed. The stowage compartment 18 may be closed by a flap 20 that is accessible in an in-use position of the flight attendant seat 16.

As shown in the first lateral view, which is situated in the middle of the drawing plane, the flight attendant seat 16 comprises a seat element 22 that may be pivoted out. In the right-hand view in the drawing plane the seat element 22 is in its folded-up position, while in the left-hand lateral view the seat element 22 has been folded down for use to an approximately horizontal position.

Figure 3:
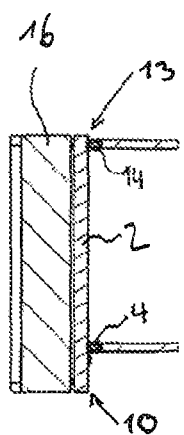
FIG. 3 shows a top view of an arrangement of a flight attendant seat on the device according to the various teachings of the present disclosure.

The general arrangement of the vehicle attendant seat 16 on the retaining body 2 is shown in FIG. 3. As shown in the diagram, the flight attendant seat 16 extends practically over the entire width of the retaining body 2. On the pivoting edge 10 the pivoting means 4 are arranged; they are connected to an elongated rail (not shown in this illustration). Locking of the flight attendant seat 16 takes place not only in a region facing the pivoting edge 10, but also on the edge 13 of the retaining body 2, which edge 13 faces away from the aforesaid.

Figure 4A:
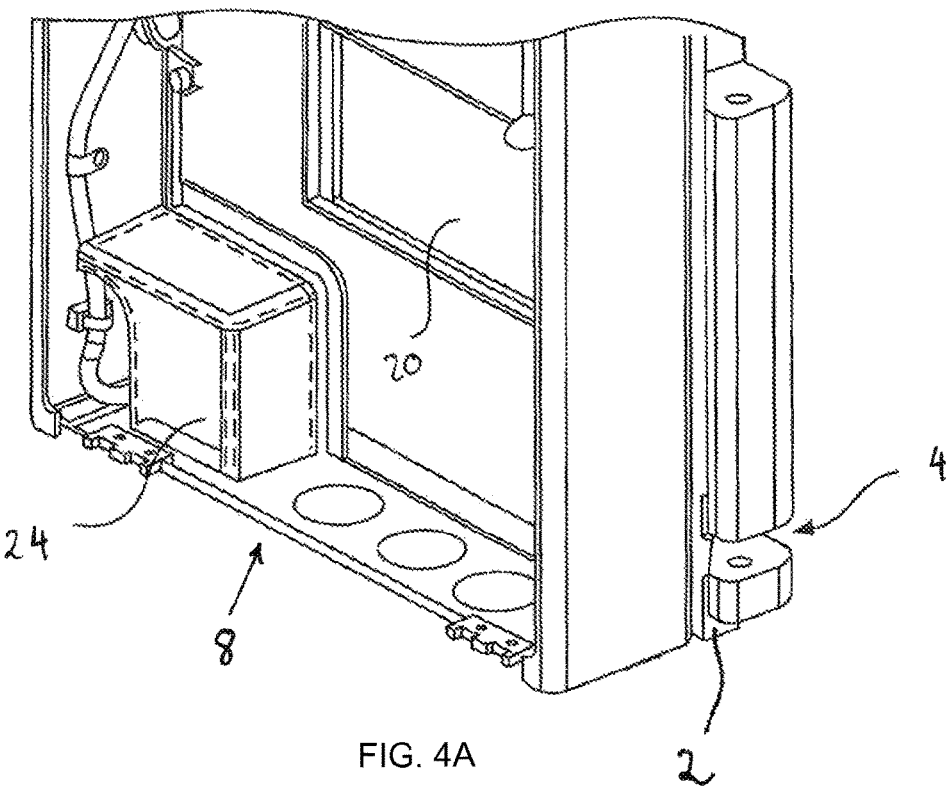
FIGS. 4A to 4C show the electrical devices for electrically connecting a vehicle attendant seat.

In some cases the supply of a vehicle attendant seat 16 with an electrical connection, for example for a handset, is compulsory. FIG. 4A shows that modification of the vehicle attendant seat is not necessary, but that instead the retaining body 2 may be adapted to this purpose in such a manner that an electrical connector device 24 is provided. It is possible to connect the electrical devices of the vehicle attendant seat to said electrical connector device 24. The electrical connector device 24 could be designed as a socket in whose interior, which is protected against external influences, all the necessary electrical connections may be established. Of course, the electrical connector device 24 may also be arranged at other locations on the retaining body 2 if the vehicle attendant seat to be affixed comprises at some other locations the connections necessary to provide the supply of electricity.

Figure 4B:
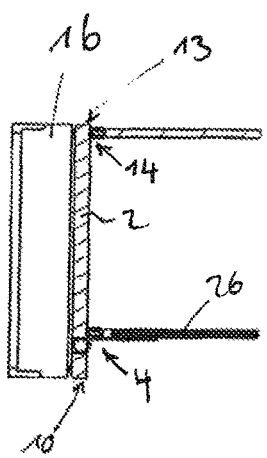

Since the retaining body 2 is pivotally held, the electrical lines necessary for the electrical connection must be fed from the retaining body 2 to a vehicle-fixed component. This could take place, as shown in FIG. 4B, by way of a pivoting means 4 along an elongated rail 26. In this arrangement the electrical connection may be implemented either by means of an electrical line by way of the pivoting means 4, or alternatively by way of a sliding contact device integrated in the pivoting means 4 concerned.

Figure 4C:
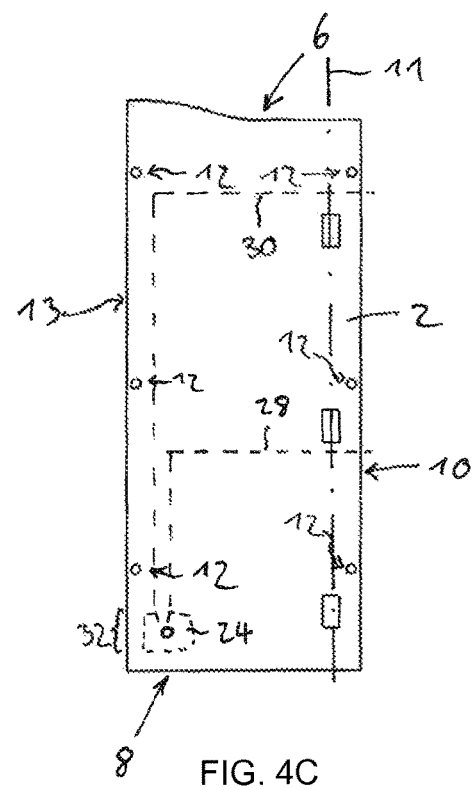

FIG. 4C further demonstrates the possible routing of electrical lines from a socket 24 to the electrical devices. For example, a first internal line 28 can be routed approximately at half the height of the retaining body 2, and a second internal line 30 may be routed at a height near the top edge 6 from where it can, for example, be routed to a handset. It should be ensured that the first and second internal lines 28 and 30 are spaced apart from each other by at least one inch, apart from a transition region 32.

Figure 5A:
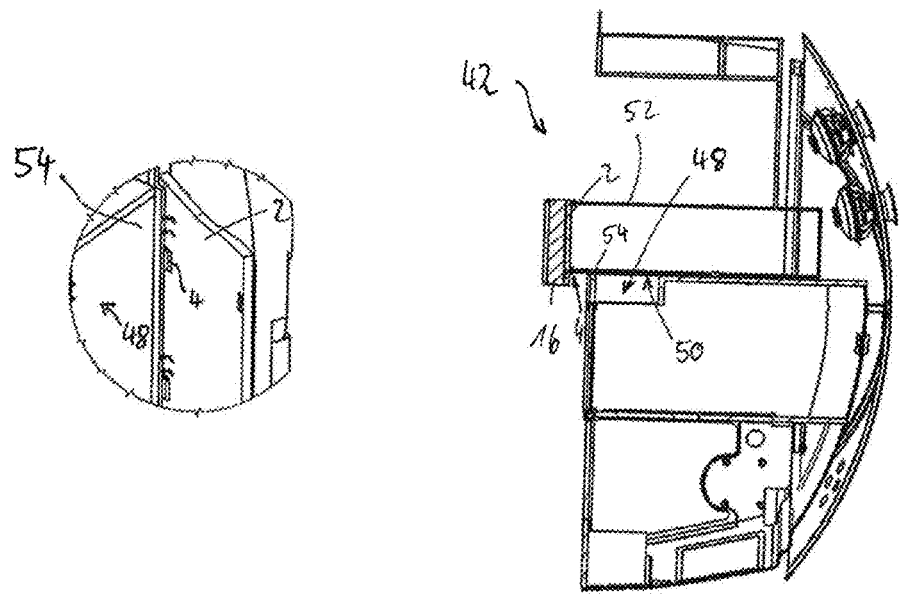
FIGS. 5A to 5C show three different top views of the device according to the various teachings of the present disclosure as well as a flight attendant seat on a cabin arrangement.
Figure 5B:
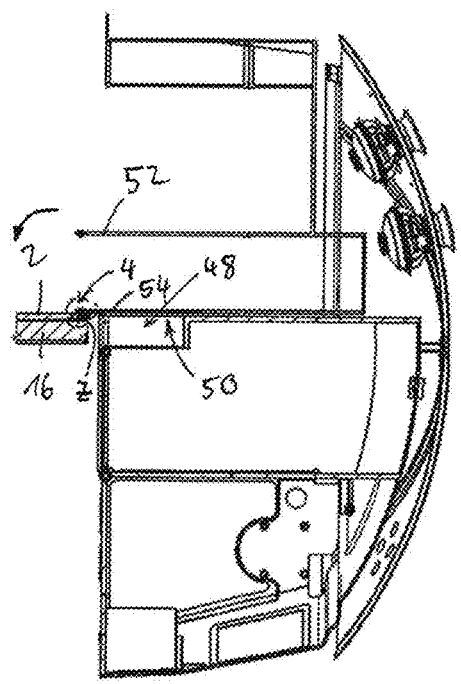
Figure 5C:
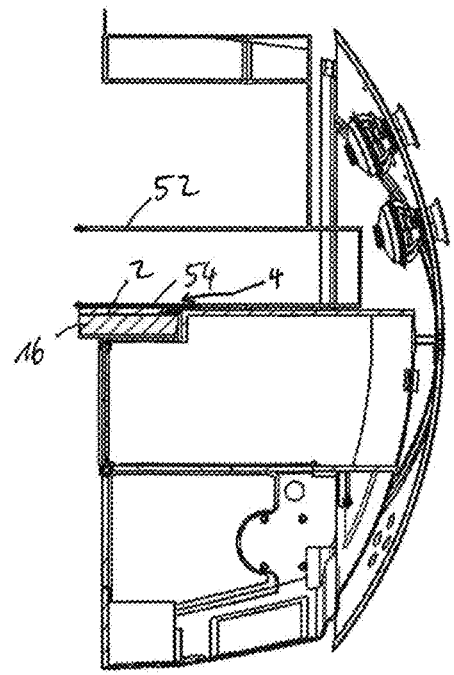

While the preceding figures show details of the vehicle attendant seat 16 and of the retaining body 2, the following FIGS. 5A to 5C in consecutive top section views of a cabin arrangement 42 show the manner in which the vehicle attendant seat 16 may be moved to an in-use position and to a stowed position. The design is intended for an aircraft cabin; and therefore the vehicle attendant seat 16 is, more precisely expressed, a flight attendant seat 16.

FIG. 5A shows the cabin arrangement 42 in which a recess 48 is arranged into which the flight attendant seat 16 may be slid. This is achieved in that a wall 54 on an interior surface 50 that faces the recess 48 comprises elongated rails on which the pivoting means 4 of the retaining body 2 are slidably held. FIG. 5A shows an in-use position in which the flight attendant seat 16 may be used by a flight attendant. The retaining body 2 is pulled completely from the recess 48 and is pivoted by 90° relative to the wall 50. On both sides of the retaining body 2 first locking means 14 establish a locking connection with corresponding elements. These first locking means 14 could be arranged on two opposite walls 52 and 54.

FIG. 5B shows an alignment of the retaining body 2 and of the flight attendant seat 16 that is arranged thereon pivoted by 90°. To this effect the first locking means 14 is detached from the wall 52 at the edge 13 opposite the pivoting means 4, and the retaining body 2 is aligned so as to be parallel to the rails, i.e. parallel to the interior surface 50.

This then makes it possible, as shown in FIG. 5C, for the retaining body 2 with the flight attendant seat 16 arranged thereon to be slidable into the recess 48. The flight attendant seat 16 finishes off so as to be approximately flush with a wall 52 so that the cabin arrangement 42 forms a pleasing external contour. The aforesaid is not uniformly flush because the wall 52 projects further into the cabin than does the wall 54. In its stowed position the flight attendant seat 16 may also project further into the cabin without this marring the overall visual impression, wherein, however, no particularly great depth for the recess 48 is required.

The following FIGS. 6A to 6J show several different three-dimensional views of part of a cabin arrangement 42 with several different positions of the flight attendant seat 16.

Figure 6A:
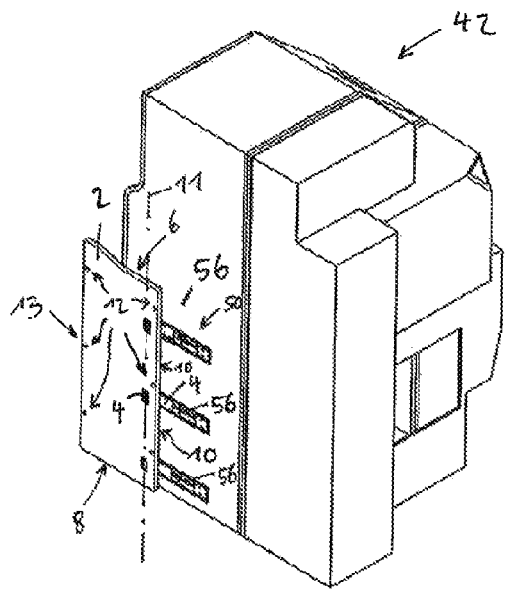
FIGS. 6A to 6J show parts of a cabin arrangement with a flight attendant seat that is movable by way of a device according to the various teachings of the present disclosure.

FIG. 6A shows a retaining body 2 that is held on three rails 56 so as to be slidable along the wall surface. Three pivoting means 4 are slidably held in the rails 56, thus making it possible for the retaining body 2 to be pivoted when the pivoting means 4 have been displaced an adequate distance on the rails 56 towards the outside, i.e. in the direction of the cabin, and when the pivoting edge 10 may pivot freely.

Figure 6B:
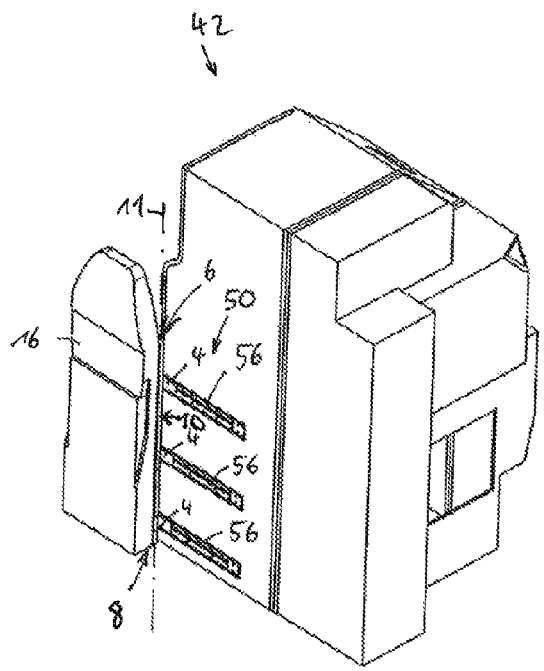
Figure 6C:
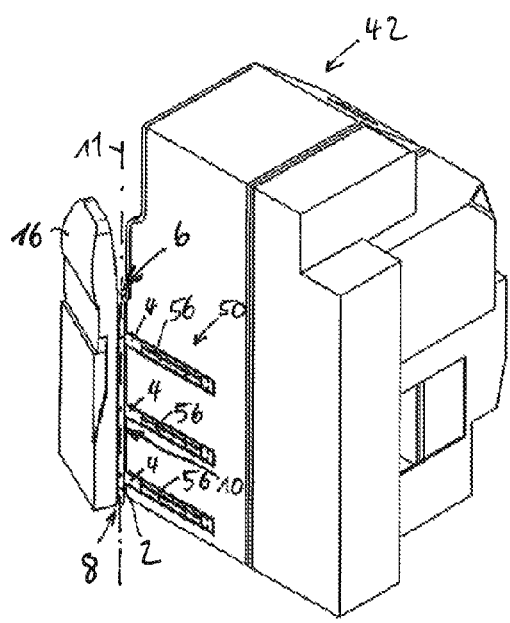
Figure 6D:
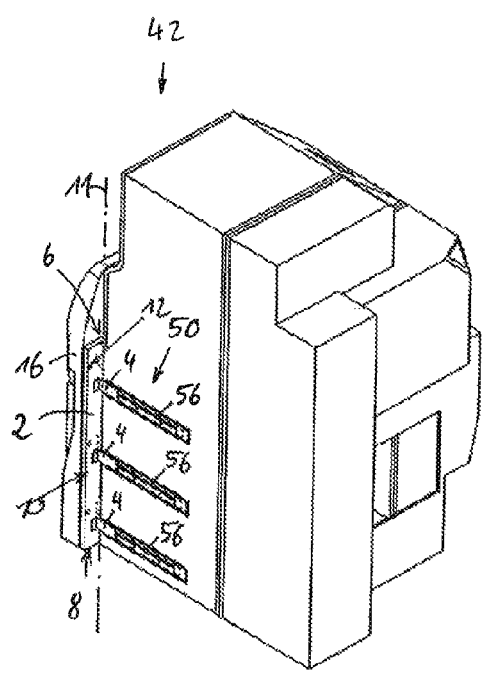

FIG. 6B shows the retaining body 2 with a flight attendant seat 16 arranged thereon, wherein the retaining body 2 is shown in a displacement-end position. In this position, as shown in the subsequent FIGS. 6C and 6D, pivoting of the retaining body 2 may take place. Thus the retaining body 2 may conform so as to be flush against a surface of the cabin arrangement 42, which surface faces into the cabin.

Figure 6E:
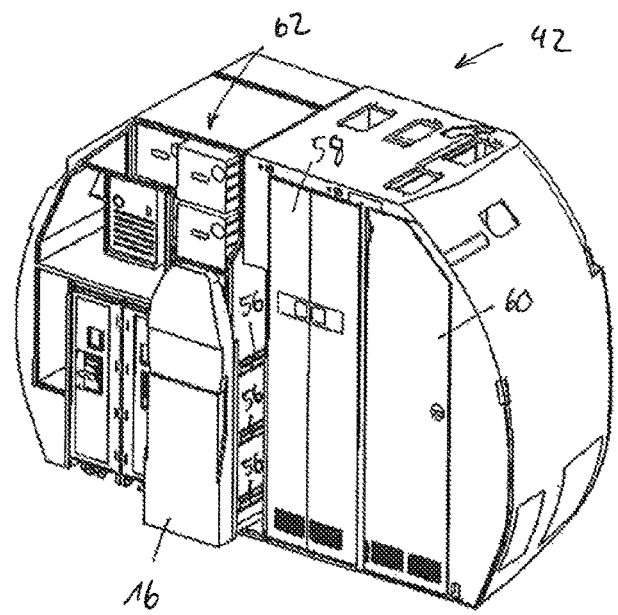
Figure 6F:
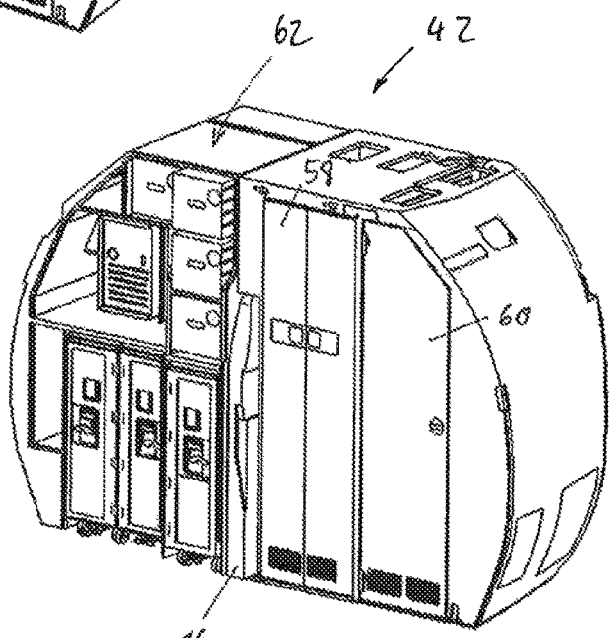

FIGS. 6E and 6F show the two end positions; FIG. 6E shows the in-use position; and FIG. 6F shows a stowed position. In this example the cabin arrangement 42 is a combined galley arrangement and toilet arrangement, wherein the right-hand part when viewed in the drawing plane accommodates two toilet spaces 58 and 60, while the left-hand part when viewed in the drawing plane shows a galley module 62 with galley equipment, stowing spaces for trolleys, and stowing spaces for utensils and foodstuffs.

Figure 6G:
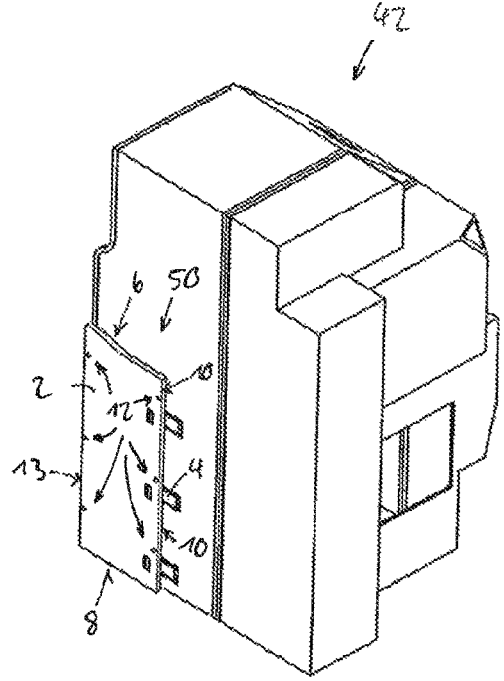
Figure 6H:
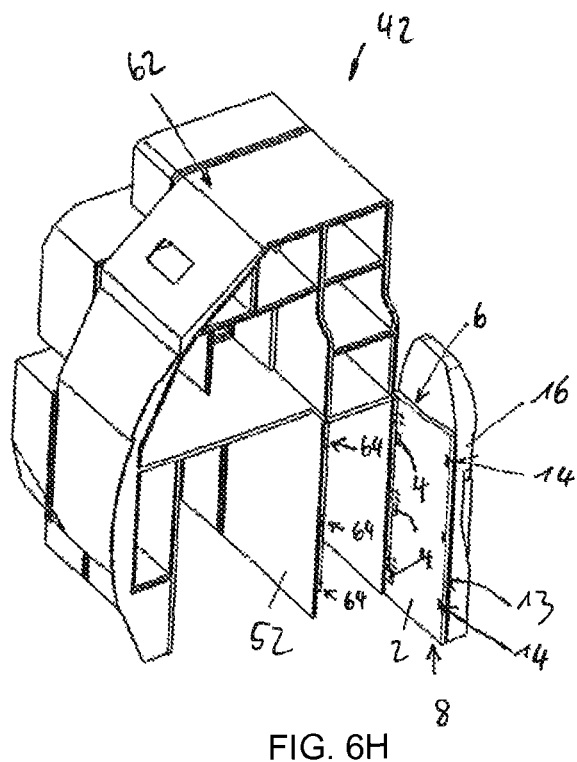

FIG. 6G shows the retaining body 2 in a moved-in/slid-in position. In this arrangement the flight attendant seat 16 is in its stowed position. The illustration of FIG. 6B is shown from another perspective in FIG. 6H. This illustration clearly shows the first locking means 14, which may establish a positive-locking connection with corresponding devices 64 on the wall 52.

Figure 6I:
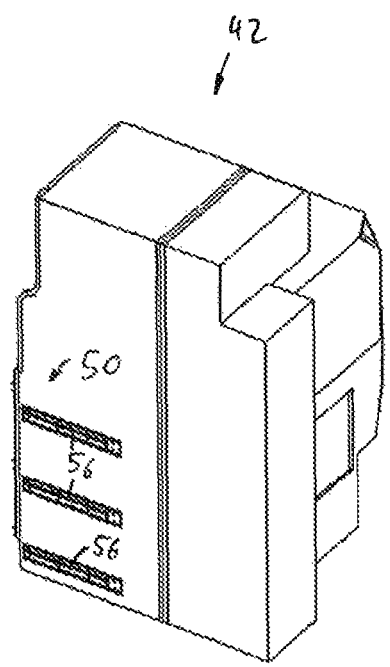
Figure 6J:
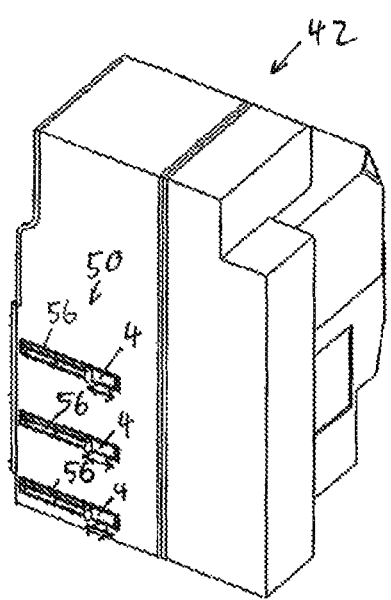

FIG. 6I shows that the elongated rails 56 may be incorporated directly in the wall 50 so that as compact an arrangement as possible exists. When this wall is designed as a honeycomb panel, a very compact but nevertheless adequately rigid construction may be achieved.

Figure 7:
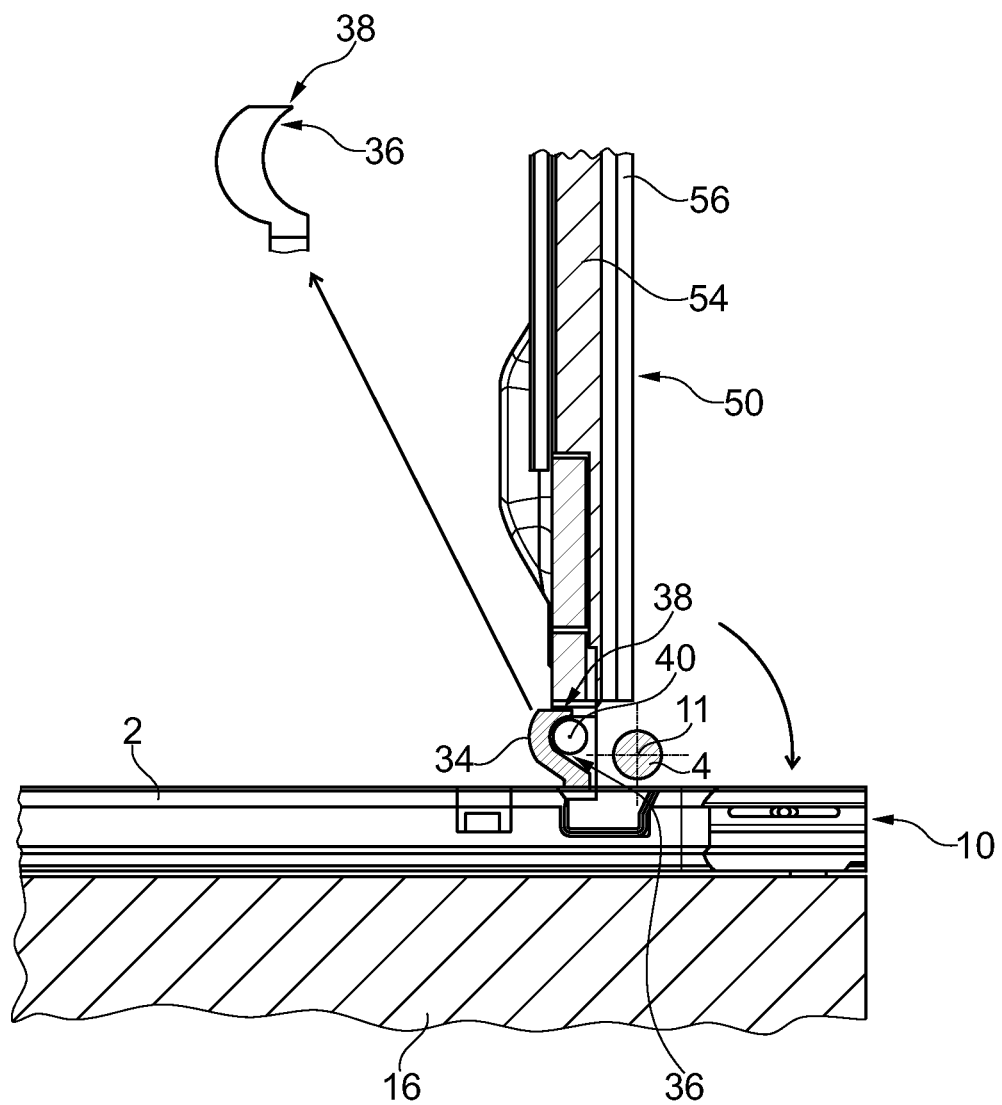
FIG. 7 shows a second locking means on a retaining body of the device according to the various teachings of the present disclosure.

Lastly, FIG. 7 shows one possible embodiment of a second locking means 34 that is arranged on the retaining body 2 at some distance from the pivoting axis 11 and facing away from the pivoting edge 10. A pivoting means 4, the rail 56 that displaceably holds the pivoting means 4, and the wall 54 are shown in a simplified form only.

The second locking means 34 is designed in the form of a hook with a running surface 36 that terminates in a tip 38 facing away from the retaining body 2. The running surface 36 and the tip 38 are designed in such a manner that with a parallel arrangement of the retaining body 2 relative to the rails 56 the tip 38 and the running surface 36 do not yet encompass a stud 40 arranged on the wall 54 (see for example FIGS. 6B and 6H). Only as pivoting commences, as shown for example in FIG. 6C, do the tip 38 and the running surface 36 grip the stud 40. In an in-use position, shown in FIG. 7, which corresponds to the in-use position of FIG. 6E, a secure positive-locking connection of the second locking means 34 with the stud 40 and thus with the wall 54 has taken place. If the first locking means 14, which is arranged on the edge 13 that is opposite the pivoting edge 10, is locked in a vehicle-fixed manner, the second locking means 34 also securely remains in the positive-locking connection. In this manner, locking of the vehicle attendant seat 16 and in particular unlocking of the vehicle attendant seat 16 from the locked position are significantly simplified, because during pivoting into place or pivoting back, the second locking means 34 is activated automatically.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A device for mounting a vehicle attendant seat in a cabin of a vehicle, comprising:
    a retaining body with a top edge, a bottom edge and a pivoting edge,
    a receiving device for a vehicle attendant seat, which receiving device is arranged on the retaining body,
    at least one pivoting mechanism affixed to the pivoting edge of the retaining body,
    at least one first locking device, and
    at least one elongated rail on which the at least one pivoting mechanism is slidably held, and the at least one elongated rail is connectable to a wall surface in the cabin of the vehicle,
    wherein external contours of the retaining body span a plane, and the receiving device is arranged on a surface of the retaining body that extends parallel to the plane, and the receiving device mechanically connects the vehicle attendant seat to the retaining body, and
    wherein the at least one pivoting mechanism is configured to pivot the retaining body between an alignment parallel to the at least one elongated rail to an alignment perpendicular to the at least one elongated rail.

2. The device of claim 1,
    wherein the at least one first locking device is arranged on the retaining body so as to be spaced apart from the at least one pivoting mechanism.

3. The device of claim 1, wherein the at least one elongated rail is at least one telescopic rail.

4. The device of claim 1, wherein the at least one pivoting mechanism is attached to the retaining body by way of a telescopic arrangement.

5. The device of claim 1, wherein the retaining body is configured to be variable in width.

6. The device of claim 1,
    further comprising an electrical connector device that is arranged on the retaining body.

7. The device of claim 6,
    wherein the electrical connector device is arranged in a region near the bottom edge of the retaining body.

8. The device of claim 6,
    wherein at least one of the at least one pivoting mechanism and the at least one elongated rail comprise sliding contacts in order to connect the electrical connector device to a vehicle-fixed component.

9. The device of claim 6,
    further comprising at least one electrical line that extends from the electrical connector device to the pivoting edge.

10. The device of claim 9,
wherein the at least one electrical line is guided by way of the at least one pivoting mechanism in order to be routed by way of the at least one elongated rail to a vehicle-fixed component.

11. A cabin arrangement in a vehicle, comprising:
a floor area,
a vehicle attendant seat,
a stowage compartment,
at least one cabin configuration component, arranged on the floor area, with a first wall, and
a device including a retaining body with a top edge, a bottom edge and a pivoting edge, a receiving device arranged on the retaining body, at least one pivoting mechanism affixed to the pivoting edge of the retaining body, at least one first locking device, and at least one elongated rail on which the at least one pivoting mechanism is slidably held,
wherein external contours of the retaining body span a plane, and the receiving device is arranged on a surface of the retaining body that extends parallel to the plane,
wherein the at least one elongated rail of the device is arranged on the first wall of the cabin configuration component, and the vehicle attendant seat is arranged on the receiving device of the retaining body, and
wherein with the vehicle attendant seat arranged on the receiving device, the retaining body is pullable from the stowage compartment completely and is pivotable to an alignment that is perpendicular to the at least one elongated rail.

12. The cabin arrangement of claim 11, wherein the stowage compartment has an interior surface, and the at least one elongated rail is affixed to the interior surface.

13. The cabin arrangement of claim 11,
wherein the at least one cabin configuration component is selected from a group of cabin configuration components, with the group comprising:
a toilet module,
a galley module,
a stowage module,
a rest compartment module,
a stair access,
a partition wall to a cockpit,
a shared space,
a prayer room,
a smokers' module,
an electronics module,
a service module,
a wash room,
a change room,
a wardrobe space,
a bar module,
a reception module, and
combinations thereof.

14. A vehicle, comprising:
a cabin,
at least one cabin arrangement including a floor area, a vehicle attendant seat, at least one cabin configuration component arranged on the floor area with a first wall, and a device having a retaining body with a top edge, a bottom edge and a pivoting edge, a receiving device arranged on the retaining body, at least one pivoting mechanism affixed to the pivoting edge of the retaining body, and at least one elongated rail on which the at least one pivoting mechanism is slidably held,
wherein external contours of the retaining body span a plane, and the receiving device is arranged on a surface of the retaining body that extends parallel to the plane,
wherein the at least one elongated rail of the device is arranged on the first wall of the cabin configuration component, and the vehicle attendant seat is arranged on the receiving device of the retaining body, and
wherein the at least one pivoting mechanism is configured to pivot the retaining body between an alignment parallel to the at least one elongated rail to an alignment perpendicular to the at least one elongated rail.

15. The cabin arrangement of claim 12, wherein with the retaining body pivoted parallel to the at least one elongated rail, the retaining body with the vehicle attendant seat arranged on the receiving device is slidable into the stowage compartment completely.

16. The vehicle of claim 14, wherein the device further comprises at least one first locking device and the at least one first locking device is arranged on the retaining body so as to be spaced apart from the at least one pivoting mechanism.

17. The vehicle of claim 14, wherein the vehicle is an aircraft.

* * * * *